(12) United States Patent
Jo

(10) Patent No.: US 12,507,026 B2
(45) Date of Patent: Dec. 23, 2025

(54) SOUND CONVERSION SYSTEM AND METHOD IN VIRTUAL REALITY

(71) Applicant: Hyun Seok Jo, Uiwang-si (KR)

(72) Inventor: Hyun Seok Jo, Uiwang-si (KR)

(*) Notice: Subject to any disclaimer, the term of this patent is extended or adjusted under 35 U.S.C. 154(b) by 289 days.

(21) Appl. No.: 18/271,603

(22) PCT Filed: Apr. 10, 2023

(86) PCT No.: PCT/KR2023/004772
§ 371 (c)(1),
(2) Date: Jul. 10, 2023

(87) PCT Pub. No.: WO2023/195830
PCT Pub. Date: Oct. 12, 2023

(65) Prior Publication Data
US 2024/0414491 A1 Dec. 12, 2024

(30) Foreign Application Priority Data
Apr. 8, 2022 (KR) .................. 10-2022-0043766

(51) Int. Cl.
*H04S 7/00* (2006.01)
*G06T 19/00* (2011.01)

(52) U.S. Cl.
CPC ............ *H04S 7/302* (2013.01); *G06T 19/003* (2013.01)

(58) Field of Classification Search
CPC ...... G06F 16/683; G06F 16/635; G06F 16/40; G06F 3/04847

USPC .......................................................... 700/94
See application file for complete search history.

(56) References Cited

U.S. PATENT DOCUMENTS

| 2020/0210127 A1* | 7/2020 | Browy ................... G06F 3/14 |
| 2024/0414492 A1* | 12/2024 | Hertensteiner ...... G10L 21/0208 |
| 2024/0428539 A1* | 12/2024 | Stauber ................ G06F 1/1671 |

FOREIGN PATENT DOCUMENTS

| KR | 10-1835675 B | 3/2018 |
| KR | 10-2019-0045696 A | 5/2019 |
| KR | 10-2019-0109019 A | 9/2019 |
| KR | 10-2020-0050707 A | 5/2020 |
| KR | 10-2271395 B1 | 6/2021 |

OTHER PUBLICATIONS

Korean Notice of Allowance dated Mar. 30, 2023 as received in application No. 10-2022-0043766.
Korean Office Action dated Nov. 17, 2022 as received in application No. 10-2022-0043766.

* cited by examiner

*Primary Examiner* — Alexander Krzystan
(74) *Attorney, Agent, or Firm* — Maschoff Brennan

(57) ABSTRACT

A sound conversion method in virtual reality implemented by a sound conversion system in the virtual reality according to an embodiment of the present invention includes forming a virtual atmosphere in the virtual reality, generating a physical force in the virtual reality, and generating virtual data on the virtual atmosphere on the basis of the physical force, wherein the virtual data is data on a state of the virtual atmosphere changed by the physical force.

6 Claims, 5 Drawing Sheets

SOUND CONVERSION SYSTEM AND METHOD IN VIRTUAL REALITY

TECHNICAL FIELD

The present invention relates to a sound conversion system and method in virtual reality, and more specifically, to a sound conversion system and method in virtual reality, in which a sound that a user can hear is converted based on a physical force generated in the virtual reality.

BACKGROUND ART

In reproducing stereophonic sound in a virtual reality (VR) environment, the stereophonic sound can be reproduced by adjusting a direction of a multi-channel virtual speaker with respect to a change in direction of a head by head-tracking on the basis of headphones.

In the case of object-based audio that utilizes images by computer graphics, such as games, a three-dimensional (3D) location of an object sound source can be reproduced in more detail by rendering a direction and distance of the object sound source according to head tracking.

However, since it is difficult to express all sounds in object-based audio when the sounds in real space are recorded, hybrid format audio including channel-based audio and object-based audio is being used.

Currently, hybrid format audio is used for Dolby Atmos and DTS DTS-X mainly for movie content, and for Dolby AC4 and MPEG MPEG-H 3D Audio mainly for broadcast content.

Meanwhile, in Korean Patent Registration No. 10-2271395 (published on Jun. 24, 2021), a method for a sound effect and a computing device for executing the same are disclosed.

However, since rays are emitted based on predetermined points in VR in order to generate sound effects (sound), there is a limitation in that sound effects are generated only at the predetermined points.

DISCLOSURE

Technical Problem

The present invention is directed to solving the above problems and providing a sound conversion system and method in virtual reality, in which a sound can be generated based on a physical force generated in the virtual reality at any predetermined location in the virtual reality.

Objects of the present invention are not limited to the above-described objects and other objects that are not described may be clearly understood by those skilled in the art from this specification and the accompanying drawings.

Technical Solution

One aspect of the present invention provides a sound conversion method in virtual reality implemented by a sound conversion system in the virtual reality, which includes forming a virtual atmosphere in the virtual reality, generating a physical force in the virtual reality, and generating virtual data on the virtual atmosphere on the basis of the physical force, wherein the virtual data is data on a state of the virtual atmosphere changed by the physical force.

Advantageous Effects

According to a sound conversion method in virtual reality according to an embodiment of the present invention, there is an advantage in that a sound can be generated based on a physical force generated in the virtual reality at any predetermined location in the virtual reality.

Effects of the present invention are not limited to the above-described effects and other effects that are not described may be clearly understood by those skilled in the art from this specification and the accompanying drawings.

MODES OF THE INVENTION

Figure 1:
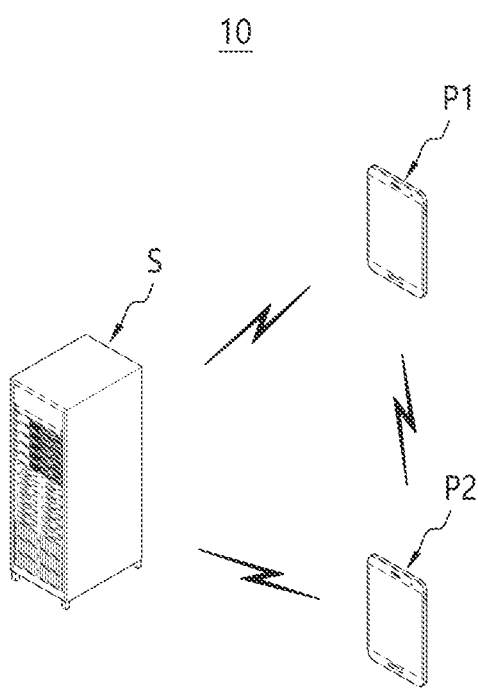
FIG. 1 is a schematic diagram for describing communication of a sound conversion system in virtual reality according to an embodiment of the present invention.

A sound conversion method in virtual reality implemented by a sound conversion system in the virtual reality according to an embodiment of the present invention includes forming a virtual atmosphere in the virtual reality, generating a physical force in the virtual reality, and generating virtual data on the virtual atmosphere on the basis of the physical force, wherein the virtual data is data on a state of the virtual atmosphere changed by the physical force.

The sound conversion method may further include specifying a predetermined location in the virtual reality, specifying the virtual data corresponding to the predetermined location, converting the virtual data into wave data, and converting the wave data into a sound.

The sound conversion method may further include transmitting the virtual data or the wave data to another electronic device.

The sound conversion method may further include changing characteristics of a character on the basis of the virtual data.

A sound conversion system in virtual reality according to another embodiment of the present invention includes an atmosphere-forming unit configured to form a virtual atmosphere in the virtual reality, a physical force generation unit configured to generate a physical force in the virtual reality, and a virtual data generation unit configured to generate virtual data on the virtual atmosphere on the basis of the physical force, wherein the virtual data is data on a state of the virtual atmosphere changed by the physical force.

The sound conversion system may further include a location-specifying unit configured to specify a predetermined location in the virtual reality, a virtual-data-specifying unit configured to specify the virtual data corresponding to the predetermined location, a wave data conversion unit configured to convert the virtual data into wave data, and a sound conversion unit configured to convert the wave data into a sound.

The sound conversion system may further include a communication unit configured to transmit the virtual data or the wave data to another electronic device.

The sound conversion system may further include a characteristic-changing unit configured to change characteristics of a character on the basis of the virtual data.

Components having the same function within the scope of the same concept appearing in the drawings of each embodiment will be described using the same reference numerals.

FIG. 1 is a schematic diagram for describing communication of a sound conversion system in virtual reality according to an embodiment of the present invention.

Figure 2:
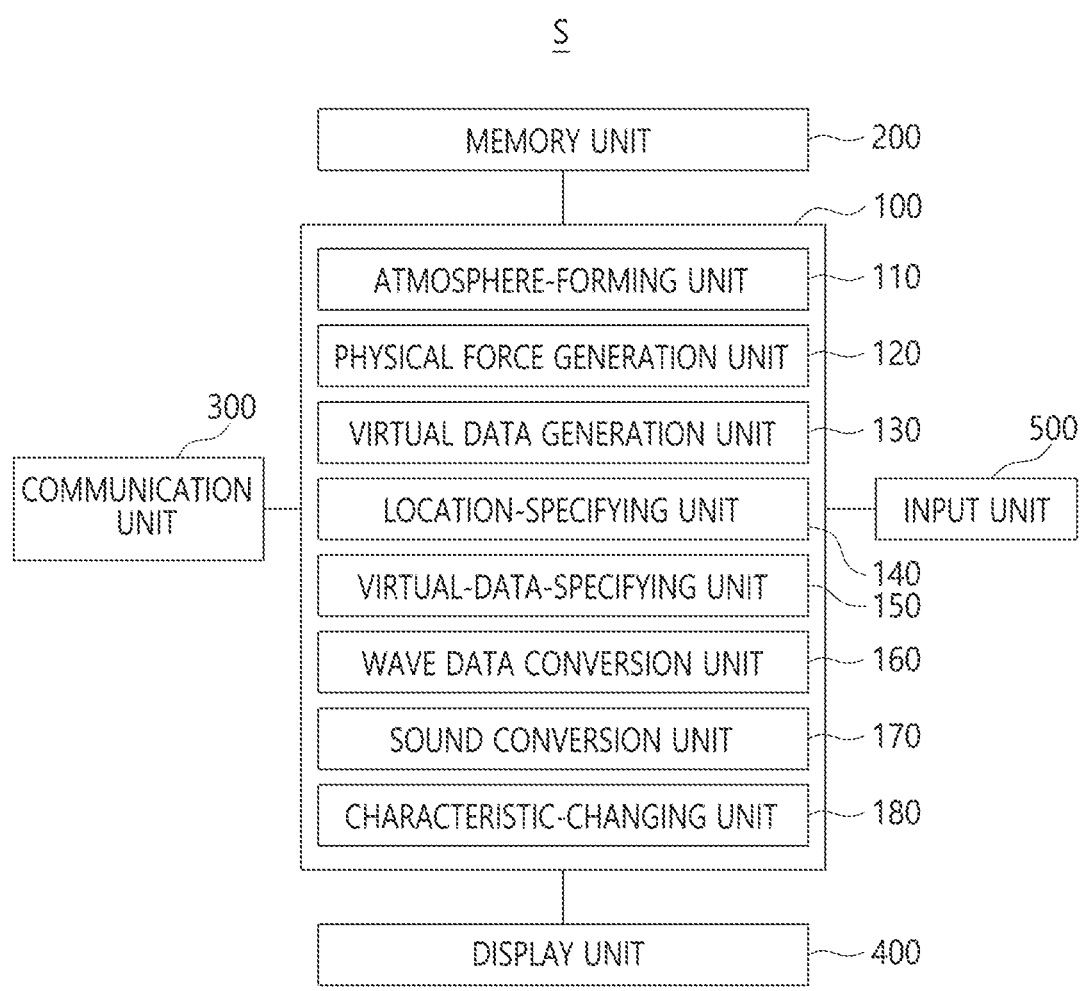
FIG. 2 is a schematic configuration block diagram of a server of a sound conversion system in virtual reality according to an embodiment of the present invention.

FIG. 2 is a schematic configuration block diagram of a server of a sound conversion system in virtual reality according to an embodiment of the present invention.

Figure 3:
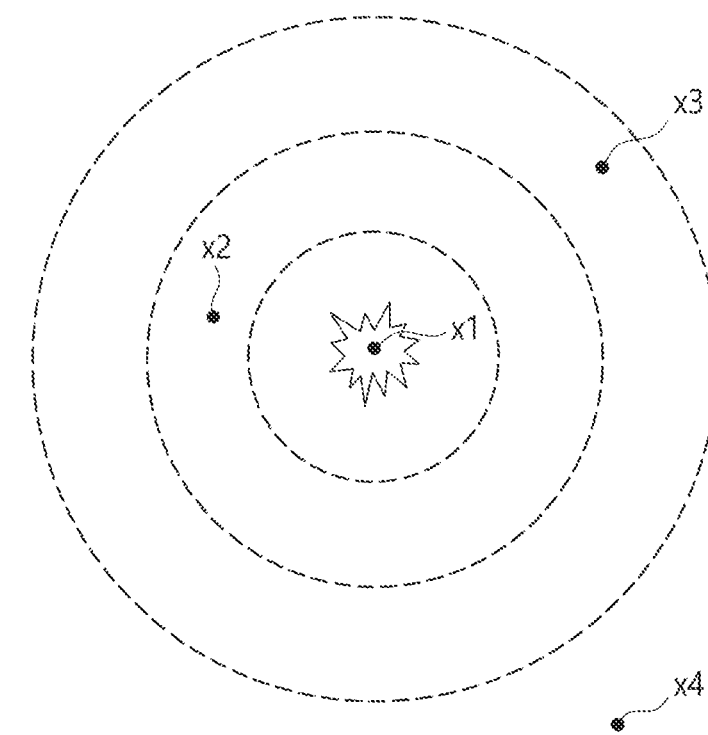
FIG. 3 is a schematic diagram for describing virtual data of a sound conversion system in virtual reality according to an embodiment of the present invention.

FIG. 3 is a schematic diagram for describing virtual data of a sound conversion system in virtual reality according to an embodiment of the present invention.

Figure 4:
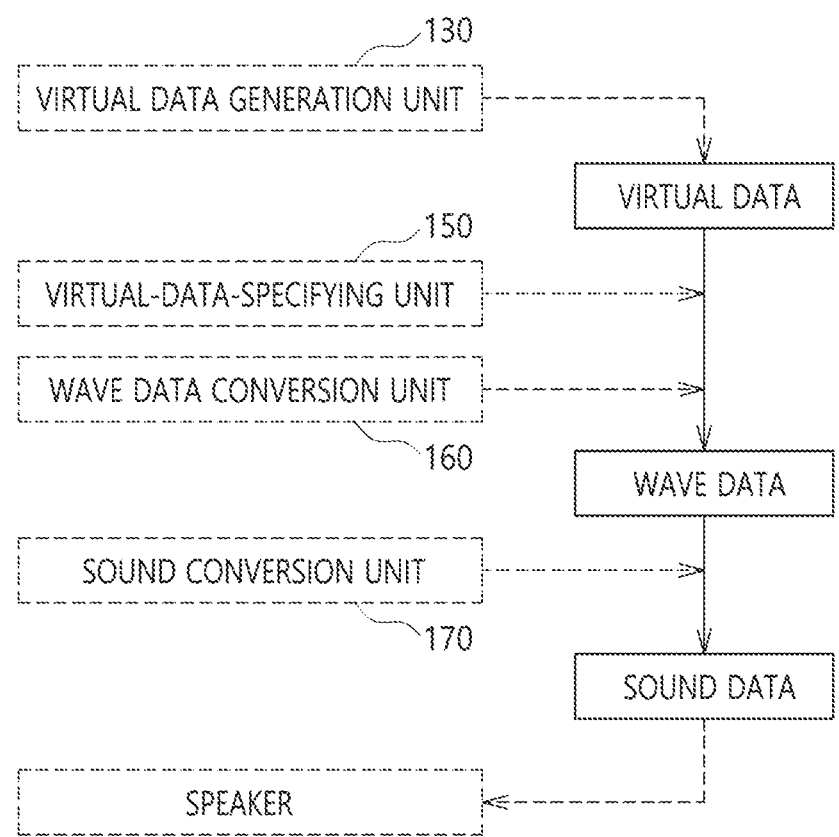
FIG. 4 is a schematic diagram for describing virtual data, wave data, and a sound of a sound conversion system in virtual reality according to an embodiment of the present invention.

FIG. 4 is a schematic diagram for describing virtual data, wave data, and a sound of a sound conversion system in virtual reality according to an embodiment of the present invention.

Figure 5:
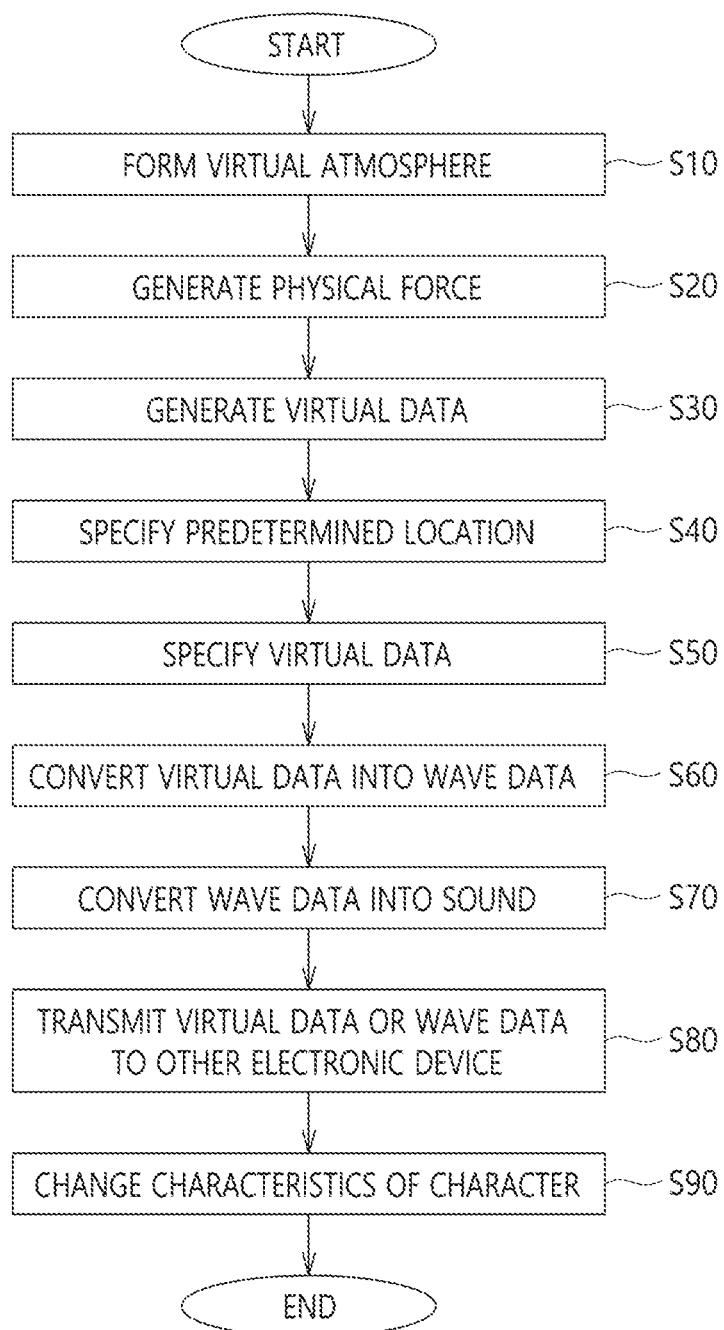
FIG. 5 is a schematic flowchart for describing a sound conversion method in virtual reality according to an embodiment of the present invention.

FIG. 5 is a schematic flowchart for describing a sound conversion method in virtual reality according to an embodiment of the present invention.

In the accompanying drawings, in order to more clearly express the technical idea of the present invention, parts that are not related to the technical idea of the present invention or can be easily derived by those skilled in the art are simplified or omitted.

Throughout this specification, when a part is referred to as being "connected" to another part, it includes "directly connected" and "electrically connected" via an intervening part. Further, when a certain part "includes" a certain component, this does not exclude other components from being included unless described otherwise, and other components may in fact be included, and it should be further understood that the terms "comprise," "comprising," "include," and/or "including," when used herein, do not preclude the presence or addition of one or more other features, integers, steps, operations, elements, parts, or combinations thereof.

In this specification, the term "unit" includes a unit realized in hardware, a unit realized in software, and a unit realized using both hardware and software. Further, one unit may be realized using two or more pieces of hardware, and two or more units may be realized using one piece of hardware.

In this specification, some operations or functions described as being performed by a terminal or device may be performed instead in a server connected to the corresponding terminal or device. Likewise, some operations or functions described as being performed by a server may also be performed in a terminal or device connected to the corresponding server.

Hereinafter, a sound conversion system 10 and method in virtual reality according to an embodiment of the present invention will be described with reference to FIGS. 1 to 5.

For example, the present invention may be the system 10 and method for converting a sound generated in a virtual reality environment and allowing a user to hear the generated sound.

For example, as illustrated in FIG. 1, the sound conversion system 10 in the virtual reality may include a server St that forms virtual reality and calculates/processes an event generated in the virtual reality, and electronic devices P1 and P2 of users that communicate with the server S to play as their characters in the virtual reality.

For example, there may be a plurality of users such as a first user, a second user, and the like.

The users' electronic devices P1 and P2 are devices that can communicate with the server S for the users to play as their characters in the virtual reality, and may be mobile terminals, desktop computers, etc., but are not limited to these types.

The sound conversion method in the virtual reality may be implemented by the sound conversion system 10 in the virtual reality.

Hereinafter, the sound conversion method and system 10 in the virtual reality will be described in more detail with reference to FIGS. 1 to 5.

For example, as illustrated in FIG. 2, the server S may include a controller 100 including an atmosphere-forming unit 110, a physical force generation unit 120, a virtual data generation unit 130, a location-specifying unit 140, a virtual-data-specifying unit 150, a wave data conversion unit 160, a sound conversion unit 170, and a characteristic-changing unit 180, which will be described below, and may further include an input unit 500 that can receive predetermined calculation values/input values, data, etc. from a manager, a communication unit 300 for communicating with other electronic devices P1 and P2 including the users' electronic devices P1 and P2, a memory unit 200 for storing predetermined data/information, and a display unit 400 for displaying predetermined data/information.

Meanwhile, as will be described below in more detail, the wave data conversion unit 160 and/or the sound conversion unit 170 may be included as one component in the users' electronic devices P1 and P2 rather than one component in the server S.

Here, for example, the sound conversion method may include an operation S10 of forming a virtual atmosphere in the virtual reality.

The operation S10 of forming the virtual atmosphere may be implemented by the atmosphere-forming unit 110.

For example, the manager of the server S may input a predetermined input value defining the virtual atmosphere in the virtual reality through the input unit 500, and the atmosphere-forming unit 110 may form the virtual atmosphere corresponding to the predetermined input value input by the manager.

For example, the predetermined input value defining the virtual atmosphere may be temperature, pressure, humidity, or the like of the virtual reality.

Meanwhile, in the operation S10 of forming the virtual atmosphere, the users may input the predetermined input value defining the virtual atmosphere through the users' electronic devices P1 and P2 and transmit the predetermined input value to the communication unit 300, and the atmosphere-forming unit 110 may form the virtual atmosphere corresponding to the predetermined input value input by the users.

Meanwhile, the sound conversion method may further include an operation S20 of generating a physical force in the virtual reality.

Here, the physical force may be a force that is a source generating a sound in the virtual reality.

For example, the operation S20 of generating the physical force may be implemented by the physical force generation unit 120.

For example, the manager of the server S may preset an object that generates the physical force in the virtual reality through the input unit 500.

For example, the object that generates the physical force may be a bomb that explodes at a specific time point.

In this case, the physical force generation unit 120 may allow a bomb to explode when a specific time point arrives, and may generate the physical force corresponding to the explosive force in the virtual atmosphere in the virtual reality.

For example, the physical force may be temperature, pressure, humidity, etc. that affects the virtual atmosphere and changes over time.

Meanwhile, in the operation S20 of generating the physical force, the users may input a predetermined input value defining the physical force through the users' electronic devices P1 and P2 and transmit the predetermined input value to the communication unit 300, and the physical force generation unit 120 may generate the physical force corresponding to the predetermined input value input by the users in the virtual atmosphere.

For example, the character of the user may install a bomb that explodes at a specific time point in the virtual reality.

Meanwhile, the sound conversion method may further include an operation S30 of generating virtual data on the virtual atmosphere on the basis of the physical force.

Here, the virtual data may be data on a state of the virtual atmosphere changed by the physical force generated on the virtual atmosphere.

That is, the physical force is generated in the virtual atmosphere in the operation S20 of generating the physical force in an initial state that is set in the operation S10 of forming the virtual atmosphere, and thus the virtual atmosphere may be changed from the initial state to another state by the physical force.

For example, the temperature, the pressure, and/or the humidity of the virtual atmosphere may increase or decrease due to the physical force over time, and changes that cause waves may occur in the virtual atmosphere.

Therefore, the virtual data may be data on the state of the virtual atmosphere changed by the physical force.

For example, the operation S30 of generating the virtual data may be implemented by the virtual data generation unit 130.

For example, as illustrated in FIG. 3, the virtual data generation unit 130 may define the state of the virtual atmosphere changed by the physical force over time based on an object that generates the physical force at a predetermined location X1 in the virtual reality.

The state of the virtual atmosphere at a location X2 relatively close to X1 may be defined as the virtual data that is relatively greatly affected by the physical force, the state of the virtual atmosphere at a location X3 relatively far from X1 may be defined as the virtual data that is affected relatively less by the physical force, and the state of the virtual atmosphere at a location X4 far away from X1 may be an initial state in which no virtual data is generated because it is not affected by the physical force.

The virtual data generation unit 130 may generate the virtual data on the virtual atmosphere on the basis of the physical force when the physical force is generated in the object that generates the physical force regardless of a location of the character of the user in the virtual reality.

That is, the virtual data generation unit 130 may generate the virtual data that changes over time in the virtual atmosphere based on a time point at which the physical force is generated, regardless of the location of the character of the user.

For example, the virtual data may be generated by the virtual data generation unit 130 according to the location in the virtual reality and the passage of time from the time point when the physical force is generated, and stored in the memory unit 200.

Meanwhile, the sound conversion method may further include an operation S40 of specifying a predetermined location in the virtual reality.

Here, the predetermined location is a specific location in the virtual reality for generating a sound in the virtual reality, and may be the location of the character of the user.

The operation S40 of specifying the predetermined location may be implemented by the location-specifying unit 140.

For example, the users may input a predetermined location in the virtual reality through the users' electronic devices P1 and P2 or input an input value for locating their character at a predetermined location to transmit the predetermined location or the input value to the communication unit 300, and the location-specifying unit 140 may locate the character of the users at a location in the virtual reality that corresponds to a predetermined input value input by the users, or specify the location.

Meanwhile, the users may input not only the predetermined location but also a specific time point and time in the present or past, through the users' electronic devices P1 and P2.

Meanwhile, the sound conversion method may further include an operation S50 of specifying the virtual data corresponding to the predetermined location.

The operation S50 of specifying the virtual data may be implemented by the virtual-data-specifying unit 150.

For example, the virtual-data-specifying unit 150 may select (specify) the virtual data corresponding to the predetermined location and/or the specific time point specified in the operation S40 of specifying the predetermined location from among a large amount of virtual data.

For example, the virtual-data-specifying unit 150 may select (specify) the virtual data corresponding to the predetermined location and/or the specific time point from among a large amount of virtual data stored in the memory unit 200.

Thereafter, the sound conversion method may further include an operation S60 of converting the virtual data selected in the operation S50 of specifying the virtual data into wave data.

For example, the wave data is intermediate data for converting the virtual data into a sound, and may be data having information on a wave (sound wave) corresponding to the virtual data.

For example, the operation S60 of converting the virtual data into the wave data is an operation that is implemented only when the virtual data is present in the operation S50 of specifying the virtual data, and may not be implemented when the virtual data is not present.

For example, the operation S60 of converting the virtual data into the wave data may be implemented by the wave data conversion unit 160.

For example, the wave data conversion unit 160 may be one component of the controller 100 of the server S, but may also be one component of the users' electronic devices P1 and P2.

When the wave data conversion unit 160 is one component of the users' electronic devices P1 and P2, the users' electronic devices P1 and P2 may receive the virtual data specified in the operation S50 of specifying the virtual data and convert the received virtual data into the wave data.

For example, the wave data conversion unit 160 may generate the wave data including frequency, pitch, wavelength, period, amplitude, sound pressure, phase, etc. constituting sound waves using the virtual data.

Thereafter, the sound conversion method may further include an operation S70 of converting the wave data into a sound.

Here, the sound is a sound that the user can hear through speakers, headphones, or the like, and the operation S70 of converting the wave data into the sound may be implemented by the sound conversion unit 170.

For example, the sound conversion unit 170 is a component that converts the wave data, which is digital information, into a sound (mp3, FLAC or wav, etc.), which is an audible sound wave, and may be one component of the controller 100 of the server S or one component of the users' electronic devices P1 and P2.

As a result, the users may hear the sound generated in the virtual reality at a predetermined location and a predetermined time point they have specified through the users' electronic devices P1 and P2.

Meanwhile, the sound conversion method may further include an operation S80 of transmitting the virtual data, the wave data, or the sound to another electronic device.

More specifically, the virtual data, the wave data, or the sound at a predetermined location and a time point in the virtual reality specified by the first user among the plurality of users may be transmitted to the electronic device P2 of the second user through the server S or the electronic device P1 of the first user.

As a result, the second user may hear the sound specified by the first user or the sound at a location at which a character of the first user is located.

Meanwhile, the sound conversion method may further include an operation S90 of changing characteristics of the character on the basis of the virtual data.

The operation S90 of changing the characteristics of the character may be implemented by the characteristic-changing unit 180.

More specifically, when a character (player character) or non-player character (NPC) of the user is located in the virtual reality in the operation S40 of specifying the predetermined location, a large amount of virtual data according to the occurrence of the physical force may be obtained, and the characteristic-changing unit 180 may change the characteristics of the character according to the obtained virtual data.

For example, when a physical force is generated by playing the piano, the character who has obtained the virtual data generated by the physical force may be changed to have a mild personality and/or appearance, and when the physical force is generated by the explosion of an explosive, the character who has obtained the virtual data generated by the physical force may be changed to have an aggressive personality and/or appearance.

That is, the characteristic-changing unit 180 may change the characteristics (personality, appearance, etc.) of the character on the basis of the virtual data corresponding to the character located in the virtual reality.

Meanwhile, in FIG. 5, the operation S40 of specifying the predetermined location is described as being performed after the operation S30 of generating the virtual data, but the present invention is not limited thereto, and it should be clear that the operation S40 of specifying the predetermined location may be performed immediately after the operation S10 of forming the virtual atmosphere or the operation S20 of generating the physical force.

Meanwhile, the sound conversion system 10 in the virtual reality may be a device in which the sound conversion method in the virtual reality is implemented through the above-described components.

As described above, in the sound conversion method and system 10 in the virtual reality, when the physical force is generated in the virtual reality, the virtual data may be generated and stored regardless of whether the character is present.

As a result, the user may obtain the virtual data corresponding to a specific location in the virtual reality and a specific time point in the past to finally hear the corresponding sound, and transmit the obtained virtual data to another user.

Although the configuration and features of the present invention have been described with reference to embodiments of the present invention, the present invention is not limited thereto. In addition, those skilled in the art may easily change and modify the embodiments within the spirit and scope of the present invention and it will be clear that such changes or modifications fall within the scope of the appended claims.

The invention claimed is:

1. A sound conversion method in virtual reality implemented by a sound conversion system in the virtual reality, comprising:
    forming a virtual atmosphere in the virtual reality;
    generating a physical force in the virtual reality;
    generating virtual data on the virtual atmosphere on the basis of the physical force, the virtual data including data on a state of the virtual atmosphere including temperature data and pressure data of the virtual atmosphere over time due to the physical force;
    specifying a predetermined location and time point in the virtual reality;
    specifying the virtual data corresponding to the predetermined location and the specific time point;
    converting the virtual data into wave data; and
    converting the wave data into a sound.

2. The sound conversion method of claim 1, further comprising transmitting the virtual data or the wave data to an electronic device.

3. The sound conversion method of claim 1, further comprising changing characteristics of a character on the basis of the virtual data.

4. A sound conversion system in virtual reality, comprising:
    an atmosphere-forming unit configured to form a virtual atmosphere in the virtual reality;
    a physical force generation unit configured to generate a physical force in the virtual reality;
    a virtual data generation unit configured to generate virtual data on the virtual atmosphere on the basis of the physical force, the virtual data including data on a state of the virtual atmosphere including temperature data and pressure data of the virtual atmosphere that change over time due to the physical force;
    a location-specifying unit configured to specify a predetermined location and time point in the virtual reality;
    a virtual-data-specifying unit configured to specify the virtual data corresponding to the predetermined location and the specific time point;
    a wave data conversion unit configured to convert the virtual data into wave data; and
    a sound conversion unit configured to convert the wave data into a sound.

5. The sound conversion system of claim 4, further comprising a communication unit configured to transmit the virtual data or the wave data to another electronic device.

6. The sound conversion system of claim 4, further comprising a characteristic-changing unit configured to change characteristics of a character on the basis of the virtual data.

* * * * *